(12) United States Patent
Bourget et al.

(10) Patent No.: US 10,873,596 B1
(45) Date of Patent: Dec. 22, 2020

(54) CYBERSECURITY ALERT, ASSESSMENT, AND REMEDIATION ENGINE

(71) Applicant: Swimlane, Inc., Louisville, CO (US)

(72) Inventors: Jean Paul Bourget, Amherst, NY (US); Michael Deale, McLean, VA (US); John Jolly, Columbia, MD (US)

(73) Assignee: Swimlane, Inc., Louisville, CO (US)

( * ) Notice: Subject to any disclaimer, the term of this patent is extended or adjusted under 35 U.S.C. 154(b) by 159 days.

(21) Appl. No.: 15/663,813

(22) Filed: Jul. 30, 2017

Related U.S. Application Data

(60) Provisional application No. 62/369,131, filed on Jul. 31, 2016.

(51) Int. Cl.
*H04L 29/06* (2006.01)
*G06N 20/00* (2019.01)
*H04L 12/58* (2006.01)

(52) U.S. Cl.
CPC ......... *H04L 63/1441* (2013.01); *G06N 20/00* (2019.01); *H04L 63/1416* (2013.01); *H04L 63/1483* (2013.01); *H04L 51/22* (2013.01)

(58) Field of Classification Search
CPC ............. H04L 63/1441; H04L 63/1416; H04L 63/1483; H04L 51/22; G06N 20/00
USPC .......................................................... 726/23
See application file for complete search history.

(56) References Cited

U.S. PATENT DOCUMENTS

| | | | | |
|---|---|---|---|---|
| 2002/0046275 A1* | 4/2002 | Crosbie | ................. | G06F 21/552 709/224 |
| 2005/0240781 A1* | 10/2005 | Gassoway | ............. | G06F 21/552 713/188 |
| 2006/0015563 A1* | 1/2006 | Judge | ................... | G06Q 10/107 709/206 |
| 2007/0006304 A1* | 1/2007 | Kramer | ................... | G06F 21/55 726/22 |
| 2009/0276705 A1* | 11/2009 | Ozdemir | ............ | G06K 9/00335 715/708 |
| 2010/0169114 A1* | 7/2010 | Henderson | ............. | G06Q 10/00 705/2 |
| 2011/0113491 A1* | 5/2011 | Altshuler | ............ | H04L 63/1425 726/24 |
| 2012/0016633 A1* | 1/2012 | Wittenstein | ........... | G06F 21/552 702/180 |
| 2013/0263264 A1* | 10/2013 | Klein | .................... | G06F 21/552 726/23 |
| 2013/0318600 A1* | 11/2013 | Serrano | ............... | G06F 21/6245 726/22 |
| 2014/0129661 A1* | 5/2014 | Thyagaraja | ............. | G06F 9/542 709/207 |
| 2015/0271199 A1* | 9/2015 | Bradley | .............. | H04L 63/1441 726/25 |

(Continued)

*Primary Examiner* — Mohammad W Reza
(74) *Attorney, Agent, or Firm* — Snell & Wilmer LLP

(57) ABSTRACT

The invention includes a computerized method for interfacing with a security hardware appliance for assessing potential remedial action in response to a potential information security threat by automatically ingesting and parsing incoming alerts from a security hardware appliance, automatically extracting relevant data elements from the alert, using the extracted information to supplement the alert by querying and retrieving from other systems, and automatically ranking the alerts in terms of importance using an engine that combines information, and issuing a command to take remedial, containment, or other programmed action on the alerts automatically.

20 Claims, 21 Drawing Sheets

(56) References Cited

U.S. PATENT DOCUMENTS

2016/0226893 A1\* 8/2016 Warikoo ............. H04L 63/1416
2016/0301704 A1\* 10/2016 Hassanzadeh ...... H04L 63/0209
2017/0318050 A1\* 11/2017 Hassanzadeh ...... H04L 63/1433

\* cited by examiner

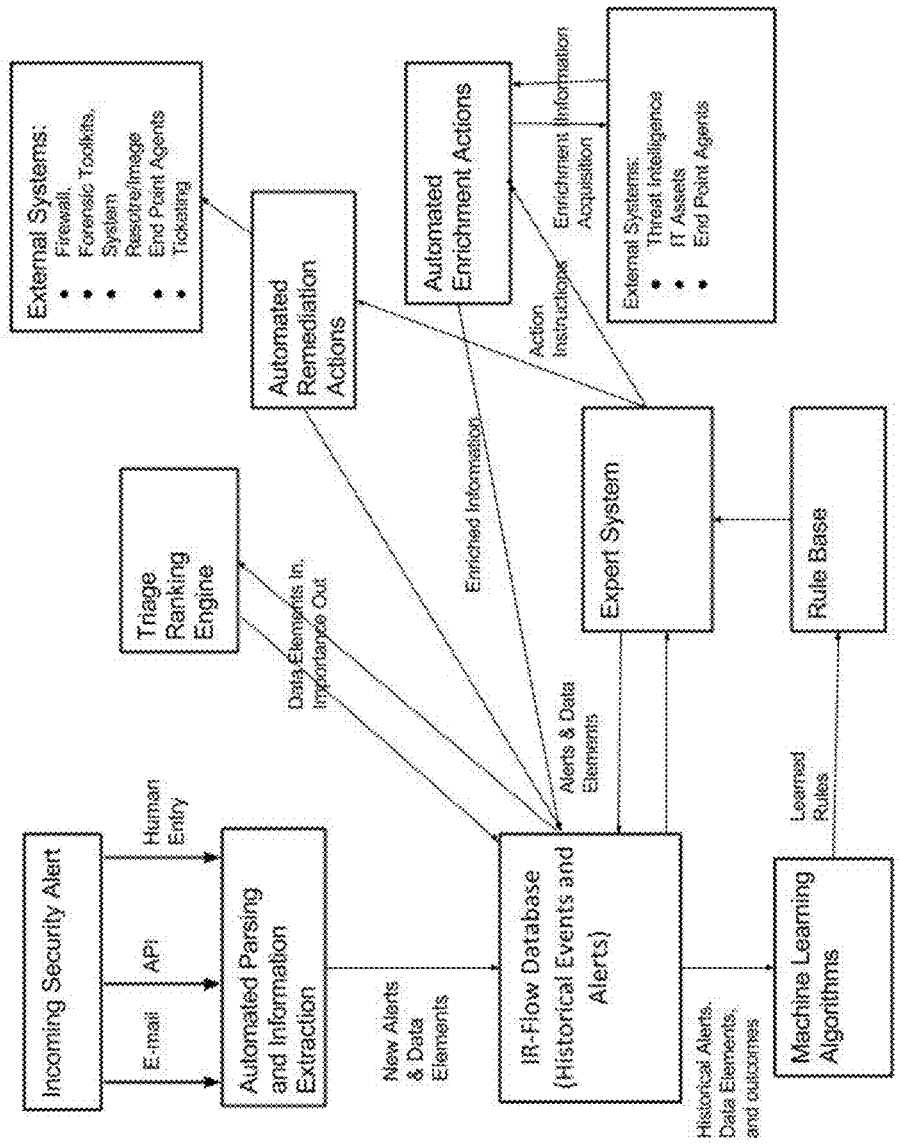
Figure 1 - High-Level Functional Overview

Figure 2 - Security Alert Data Elements for a phishing alert

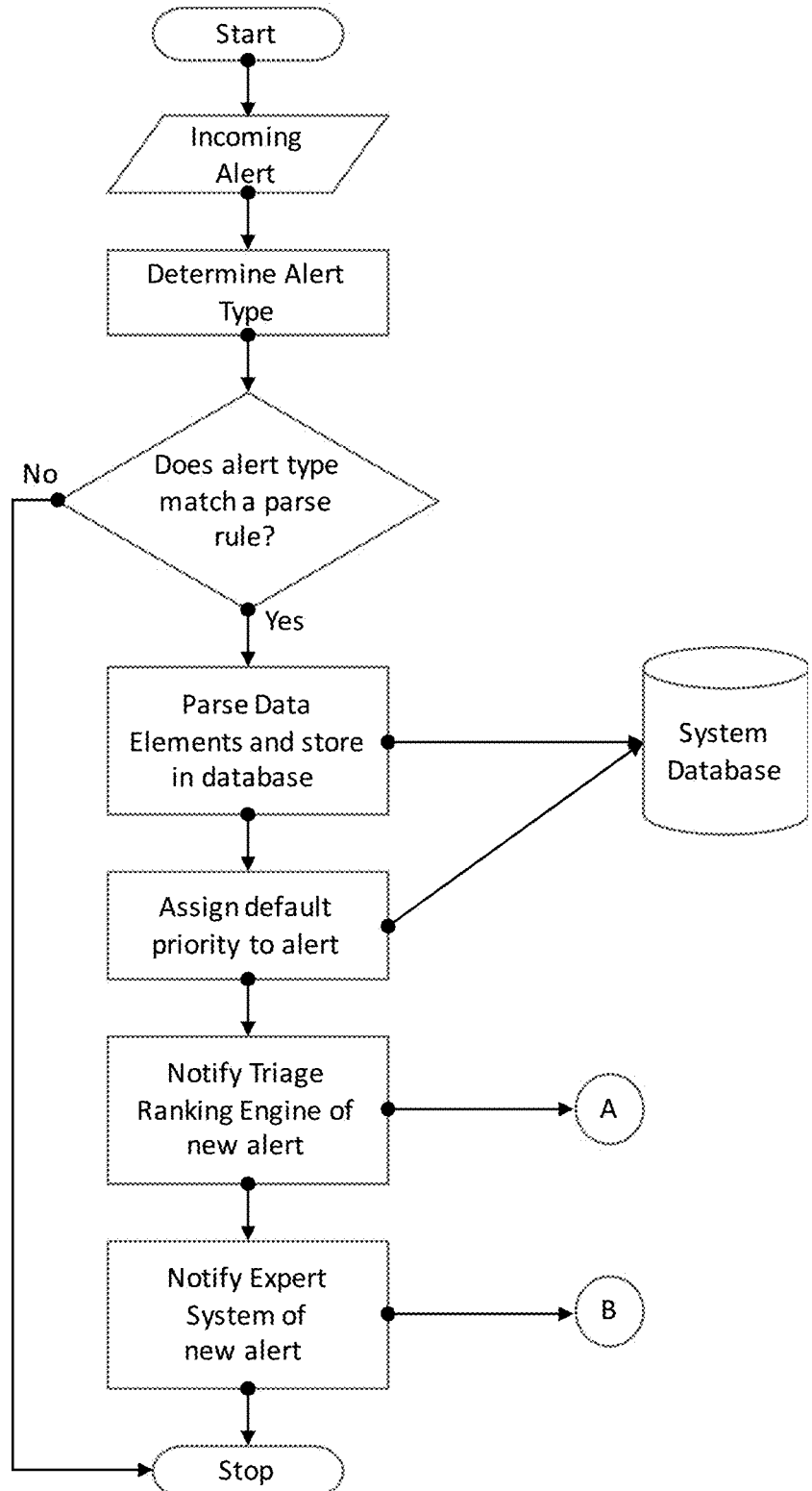
Figure 3 - Process Flow for New Alerts

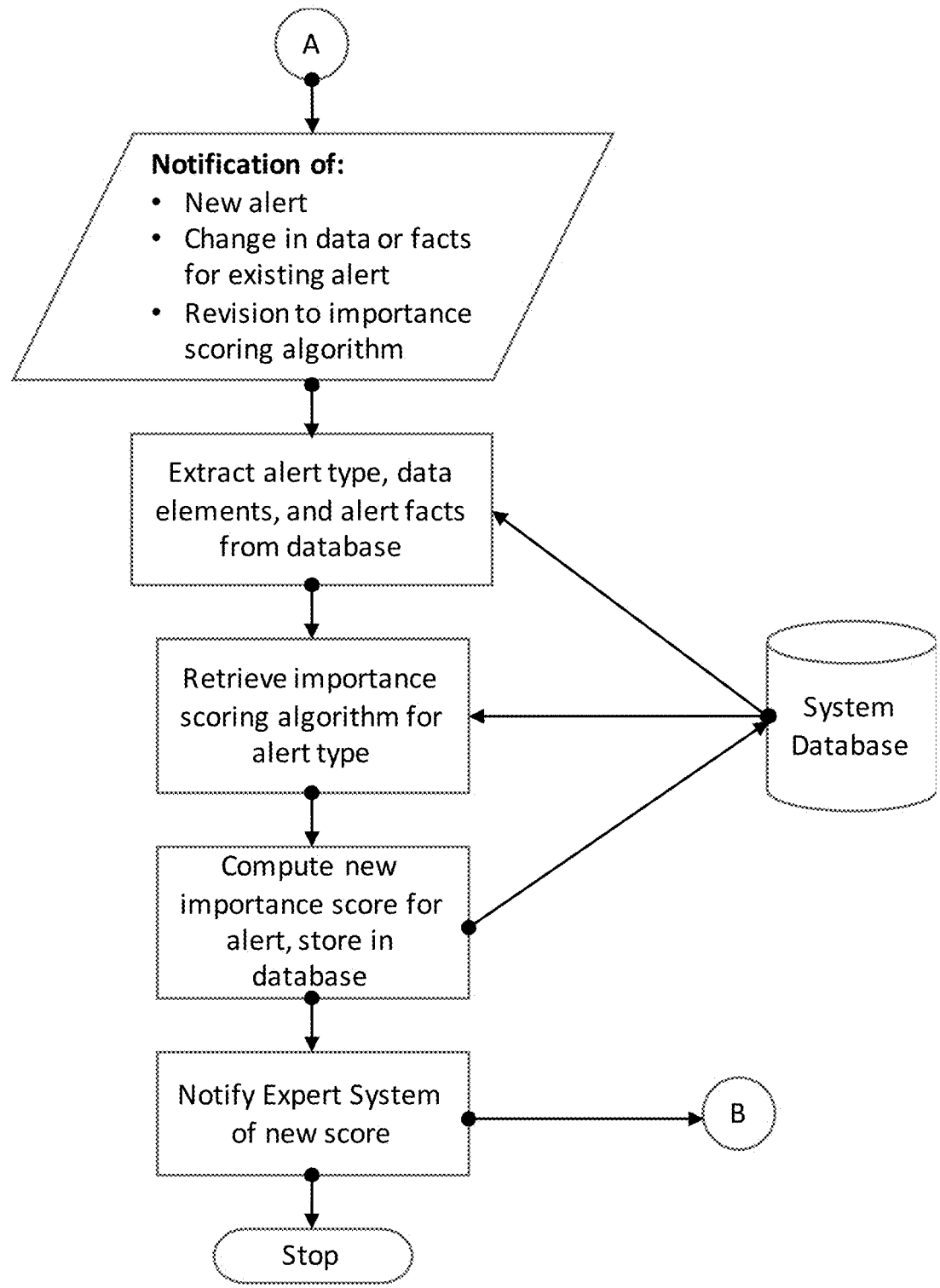
Figure 4 - Triage Ranking Engine (and Alert-Re-ranking) Process Flow

Figure 5 - Expert System Basic Process Flow
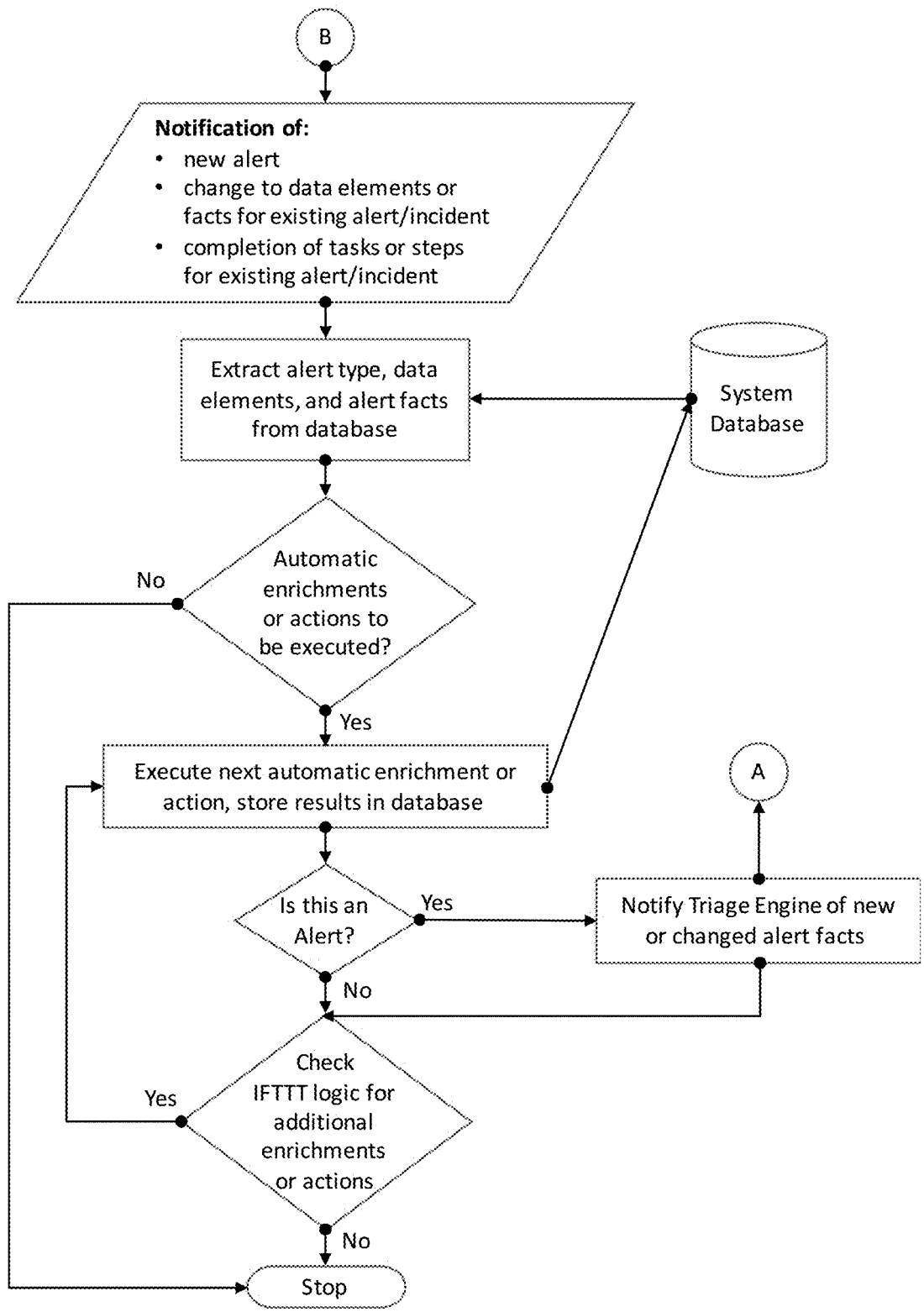

Figure 6 - Default Check List

Default Check List

| Check Description | Fires Action |
|---|---|
| Reverse DNS lookup on external IP | No Action |
| Other Activity from source IP in last 24 hours? | No Action |
| Get Hostname | No Action |
| Validate event | No Action |
| DNS Lookup | Auto-Fires Action |
| Crowdstrike Domain Query | Auto-Fires Action |

Block link at firewall

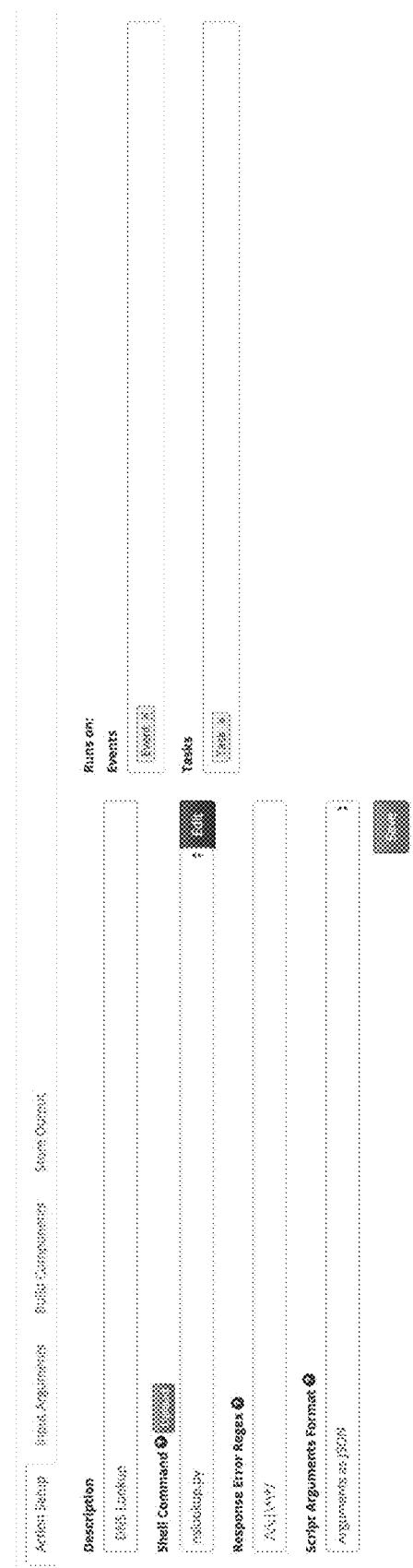
Figure 7 - Automated Query -- Action Setup

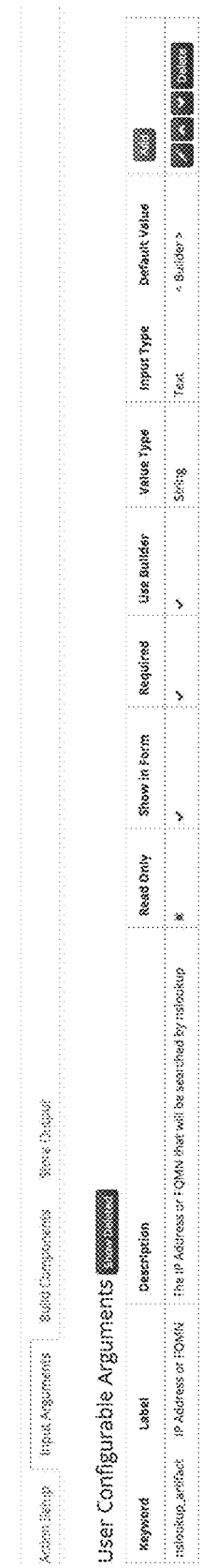

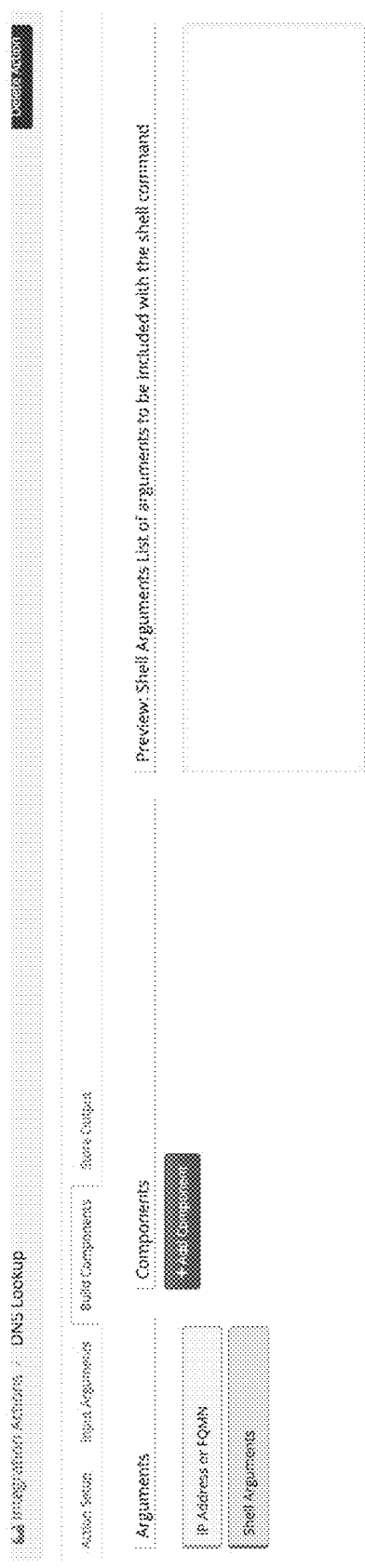
Figure 9 - Automated Query – Build Components
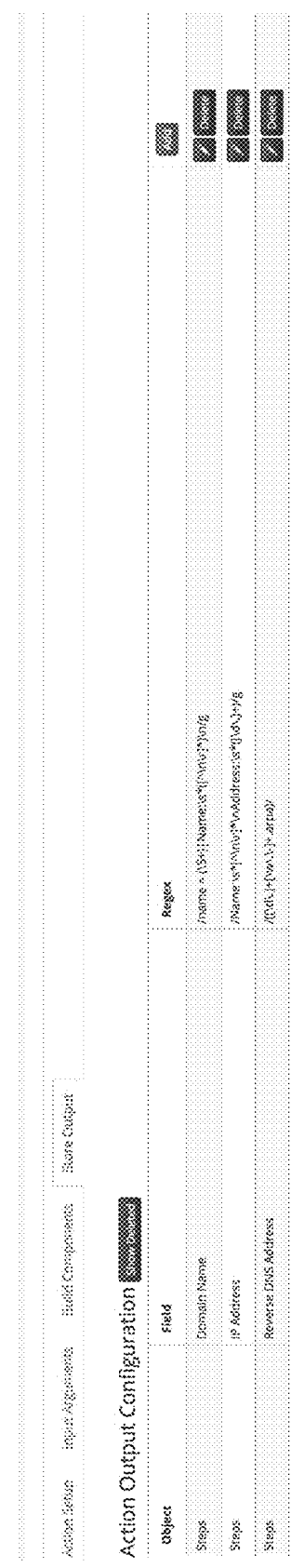
Figure 10 - Automated Query – Store Output Figure 11 - Sample Query Results

| Incoming Data Phishing | |
|---|---|
| Crowdstrike Domain | www.we11point.com |
| Crowdstrike Malicious | high |
| Confidence | |
| Domain Name | google-public-dns-a.google.com. |
| Proofpoint URL | 13981973 |
| Reporting Person | brian@synccurity.net |
| Reverse DNS Address | 8.8.8.8.in-addr.arpa |
| Short Description | phish |
| URL of phishing form | http://www.phishme.cl/media/Survive/Googlee/index.ph p |

| Checks | 75% Complete |
|---|---|
| Action Checks | |
| ✓ | Crowdstrike Domain Query |
| ✓ | DNS Lookup |
| User Checks | |
| ☒ | Obtain Phishing Email |
| ☒ | Reverse DNS lookup on external IP |
| ☒ | Check for forged headers |
| ☒ | Check for forged REPLY TO: email address |
| ☐ | Whois Look up for Domain Age and Location |
| ☐ | Validate Actual Phishing Attempt |

Figure 12 – System Triage Queue

Figure 13 – Triage Alert Detail and Steps
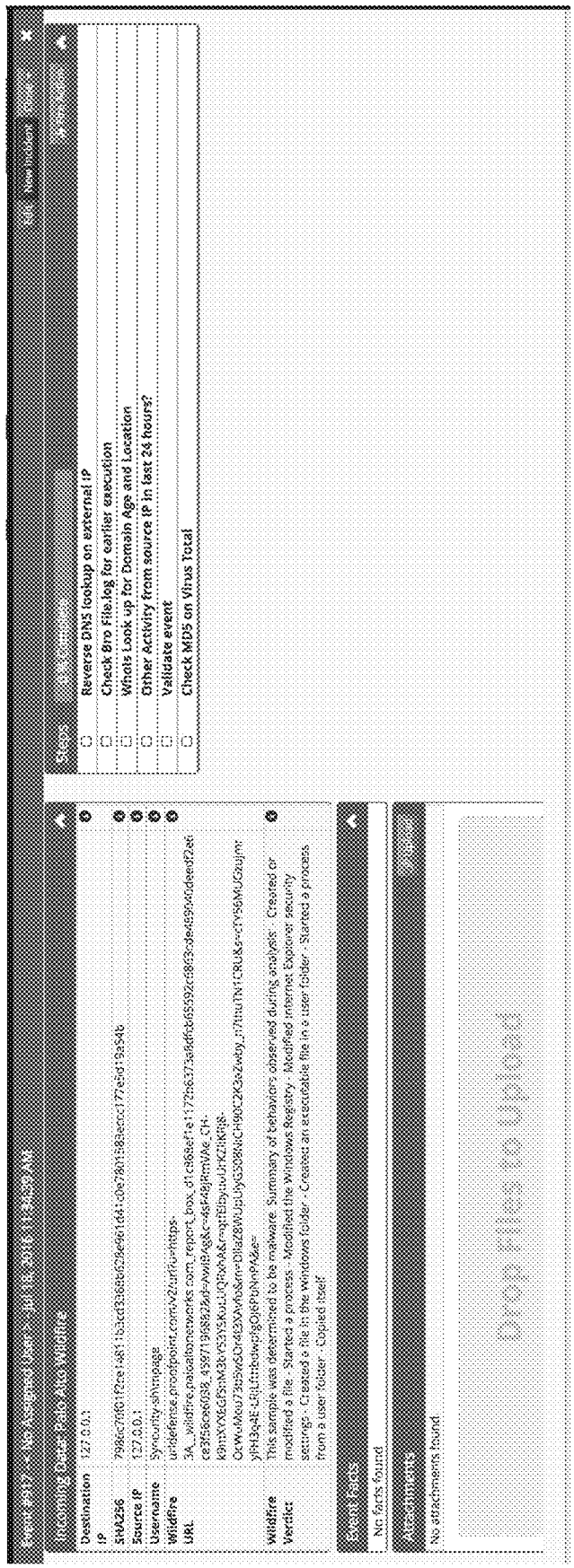

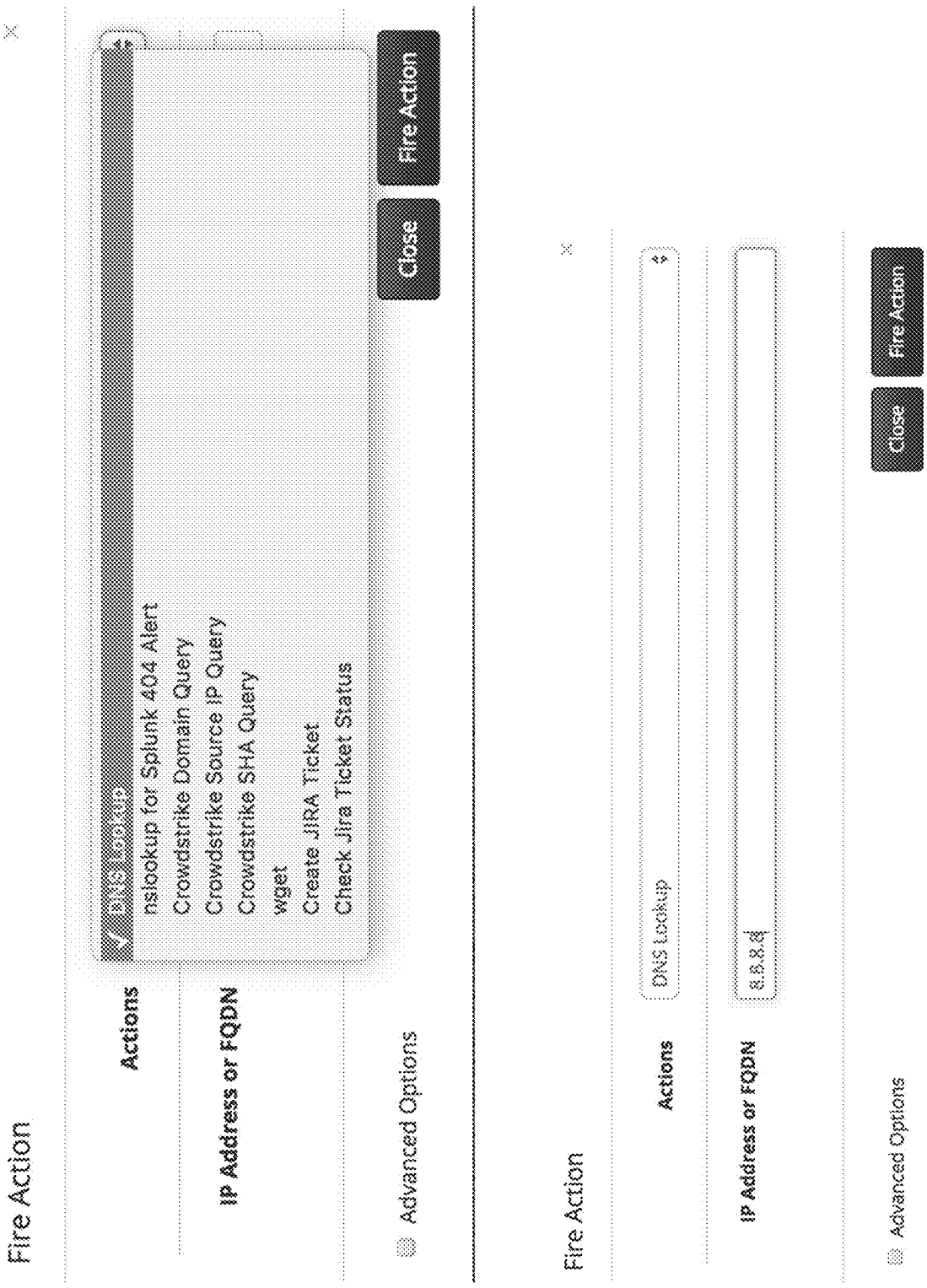

Figure 15 - Triage Check List

| Steps | 43 % Complete | |
|---|---|---|
| ✓ | Reverse DNS lookup on external IP | |
| ✓ | Check Bro File.log for earlier execution | |
| ☐ | Whois Look up for Domain Age and Location | |
| ☐ | Other Activity from source IP in last 24 hours? | |
| ☐ | Validate event | |
| ✓ | DNS Lookup | |
| | ├ Domain Name | google-public-dns-a.google.com. |
| | ├ IP Address | empty |
| | ├ Reverse DNS Address | 8.8.8.8.in-addr.arpa |
| ☐ | Check MD5 on Virus Total | |

Figure 16 - Event Fact table after DNS Lookup

| Incoming Data: Palo Alto Wildfire | |
|---|---|
| Destination IP | 127.0.0.1 |
| SHA256 | 7986c70f01f2ce14811b3cd3368b628e961d41c0e7801583eccc177e5d19a54b |
| Source IP | 127.0.0.1 |
| Username | Syncurity-sh\mpage |
| Wildfire URL | urldefense.proofpoint.com/v2/url?u=https-3A_wildfire.paloaltonetworks.com_report_box_d1c868ef1e1172b6373a8dfcb65592c6863cde48904deedf2e6ce3f56ce6038_45971968828d=AwIBAg&c=4sF48jRmVAe_CH-k9mXYXEGfSnM3bY53YSKuLUQRxhA&r=qtEIbyuuUrKZIlKRj8-OcWuMou73b5wSOr4t3XAvfo&m=DIIaZ8WUpUIyGS08NICH90C2K3aZwby_n7thuTN1CRU&s=cTY56MUGzujmryFH3q4E-LRjLfthbdwpfgOj6PbNmPA&e= |
| Wildfire Verdict | This sample was determined to be malware, Summary of behaviors observed during analysis: - Created or modified a file - Started a process - Modified the Windows Registry - Modified Internet Explorer security settings - Created a file in the Windows folder - Created an executable file in a user folder - Started a process from a user folder - Copied itself |

| Event Facts | |
|---|---|
| Domain Name | google-public-dns-a.google.com. |
| IP Address | empty |
| Reverse DNS Address | 8.8.8.8.in-addr.arpa |

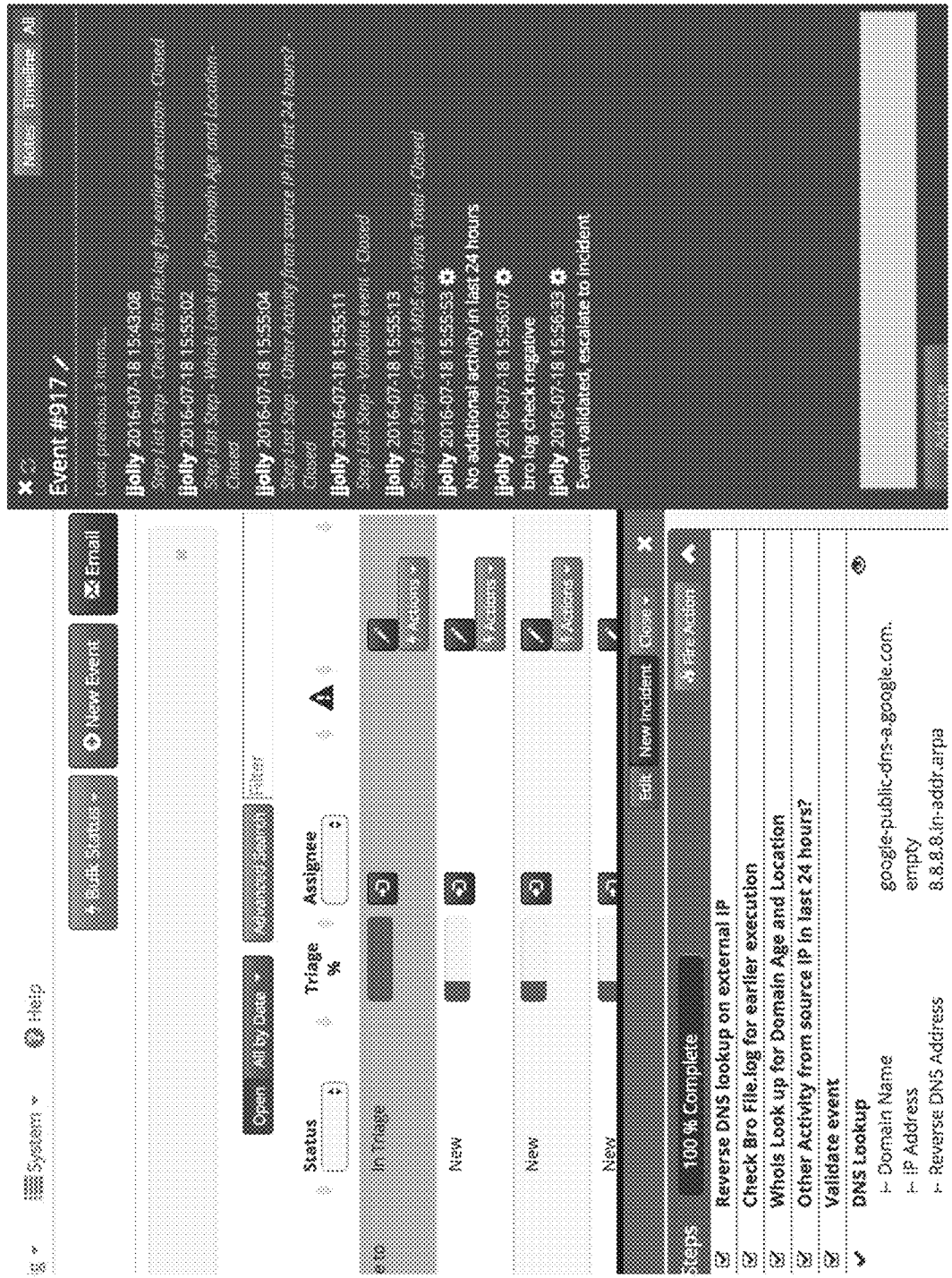
Figure 17 - Triage Documentation and Completion

Figure 18 – Phishing Playbook

Figure 19 - Inbound Phishing Task 1 – Investigate Attack Info

Tasks

| Assigned | Priority | Stage | Status | Task % | Name |
|---|---|---|---|---|---|
| jpbourget | High | Identification | New | | Investigate Attack Info |
| jpbourget | High | Identification | Waiting | | Scope Number of affected users |
| jjolly | High | Containment | Waiting | | Contain Phish with Network and Email Controls |
| jpbourget | High | Eradication | Waiting | | Remediate Phished Users |
| jjolly | High | Recovery | New | | Remove Malware if users are infected |
| RPeck | Urgent | Lessons | Waiting | | Blackhole DNS to protect org |

Task Steps

- ☐ Get Hostname
- ☐ Get URL phishing form (from email)
- ☐ Get URL of submitted form
- ☐ DNS Lookup
- ☐ Get URLs of Redirects Figure 20 - Task 1 Complete Figure 21 - Adding a task in real time

Tasks

| Assigned | Priority | Stage | Status | Task % | Name | Timeline |
|---|---|---|---|---|---|---|
| jpbourget | High | Identification | Closed | ▬▬ | Investigate Attack Info | ◪ |
| jpbourget | High | Identification | Closed | ▬▬ | Scope Number of affected users | ◪ |
| jolly | High | Containment | Closed | ▬▬ | Contain Phish with Network and Email Controls | ◪ |
| jpbourget | High | Eradication | Closed | ▬▬ | Remediate Phished Users | ◪ |
| jpbourget | Normal | Eradication | New | | Clean System | ◪ |

Figure 22 - Incident Complete

Incident Summary

| Owner: | jolly | Duration: | 0d 0h 36m |
|---|---|---|---|
| Tasks Open: | 0 | Stage: | Closed |
| Severity: | Incident | Priority: | Urgent |
| Type: | Phishing | Sub Type: | Inbound Phishing |
| Description: | | | |

Tasks

| Assigned | Priority | Stage | Status | Task % | Name |
|---|---|---|---|---|---|
| jpbourget | High | Identification | Closed | | Investigate Attack Info |
| jpbourget | High | Identification | Closed | | Scope Number of affected users |
| jolly | High | Containment | Closed | | Contain Phish with Network and Email Controls |
| jpbourget | High | Eradication | Closed | | Remediate Phished Users |
| | Normal | Eradication | Closed | | Clean System |
| jolly | High | Recovery | Closed | | Remove Malware if users are infected |
| RPeck | Urgent | Lessons | Closed | | Blackhole DNS to protect org |

Events

| Date Time | Event Type | Data Source | Description | Source IP | Source Port | Username | Destination IP | Reporting Person | Short Description | Actions |
|---|---|---|---|---|---|---|---|---|---|---|
| 2016-07-06 17:59:58 | | Splunk - ADA Alert | Splunk Ticket | 127.0.0.1 | | | | | | |
| 2016-07-18 17:55:42 | | Palo Alto Wildfire | | | | unknown | 127.0.0.1 | | | |

CYBERSECURITY ALERT, ASSESSMENT, AND REMEDIATION ENGINE

CROSS-REFERENCE TO RELATED APPLICATIONS

This application claims the benefit of U.S. Provisional Application No. 62/369,131, filed 31 Jul. 2016, the contents of which are herein incorporated by reference in its entirety

FIELD OF THE INVENTION

The present invention relates generally to techniques for interfacing with a security hardware appliance for assessing potential remedial action in response to a potential information security threat.

BACKGROUND OF THE INVENTION

One of the major challenges facing modern cybersecurity incident response teams today is responding to the overwhelming alert volume received from intrusion detection and preventions systems, malware detection systems, endpoint systems, security and information event management systems (SIEMs), and myriad other security systems. All of these systems generate alerts of various priority, importance, format, structure, and relevance that humans need to examine in order to rapidly separate true positives from false positives and take remedial action to contain the threats represented by alerts that are true positives before they become breaches.

This incident response process today is typically performed manually using non-purpose built tools such as e-mail and spreadsheets without the benefits in accuracy, speed, and reliability that could be provided by purpose-built systems that combine the power of information extraction, automated information enrichment, automated remediation, expert systems and machine learning, all with full integration and active participation of the system operators using human intelligence and flexibility. These existing manual processes are slow, non-optimized, make poor use of historical or relevant data, have inconsistent adherence to approved process, lack appropriate documentation and auditing, and are rife with potential for error.

BRIEF SUMMARY OF THE INVENTION

The inventive cybersecurity alert triage ranking engine and expert assessment and remediation system described herein addresses these challenges with a system to perform in an automated manner most or all of this alert ranking, enrichment, assessment and remediation work. The system can include the following:

The ability to automatically parse and ingest incoming alerts whether transmitted by a pre-defined API or an ASCII text email and to automatically extract relevant data elements from the alert, with IP addresses, hashes, alert priority, description, and hostnames, as non-limiting examples of data elements.

The ability to use the extracted information to automatically enrich the alert by querying and retrieving from other cybersecurity systems, information systems, or databases relevant and important information that adds context to the alert. As non-limiting examples these systems may include threat-intelligence databases, threat intelligence feeds, IT asset inventory systems, Security Information Event Management systems, end-point systems, cybersecurity systems or other information systems.

The ability to automatically rank these alerts in terms of importance using an engine that combines information, including properties of the alert, enrichments to the alert and any other information that may be available about an alert, non-limiting examples of such information being historical forensic information about prior alerts, IT asset inventory/data, and real-time threat intelligence feeds.

The ability to perform this alert ranking dynamically (dynamic re-ranking) every time the state of an alert changes as a result of new information obtained by or created in the system.

The ability to take remedial, containment, or any other programmed action on the alerts automatically using an if this then that (IFTTT) expert system.

The ability to apply machine learning techniques to automatically learn and discover rules and data about alerts and the ranking of alerts using any information stored in or available to the system, non-limiting examples of such information being historical forensic information about prior alerts, IT asset inventory/data, and real-time threat intelligence feeds.

The ability to use e-mail to automatically inform users about the status, disposition, or creation or receipt of an alert.

The ability to reason about the alert data elements to derive new information, recommend actions, or automatically take any action the system is capable of executing.

The hardware and software comprising the system environment can comprise:

One or more host computer systems, which may be instantiated as either physical or virtual hosts. These hosts can run either Ubuntu, CentOS, RedHat, or a similar variant of the UNIX operating system. Multiple host systems can be used as necessary to ensure system performance is adequate. These hosts may be stood up either in the user's enterprise environment ("on-prem") or in the cloud ("off-prem"). The software can be written using MySQL for data storage and queries, PHP and Laravel for the server side business logic and data model, the Apache web server and a combination of HTML 5, CSS, JQuery and AngularJS to for client-side scripting of the UI and business logic. Additional system software can be developed using C, C++, and similar languages as well as the Python, BASH, and Perl scripting languages.

This environment is not intended to be limiting, it would be possible to build the system described herein using a different hardware and software environment as long as it delivered comparable functionality and performance characteristics.

BRIEF DESCRIPTION OF THE DRAWINGS

Embodiments of the invention will now be described, by way of example only, with reference to the accompanying drawings, in which:

FIG. 1 illustrates a high-level functional overview of an example system.

FIG. 2 illustrates example security alert data elements for a phishing alert.

FIG. 3 illustrates an example process flow for new alerts received by the system.

FIG. 4 illustrates an example process flow for a triage ranking engine.

FIG. 5 illustrates an example process flow used by the expert system.

FIG. 6 illustrates an example a default check list for a phishing alert that uses the expert system to automatically run a DNS lookup and a domain query.

FIGS. 7-10 illustrate example configurations of a query to perform a DNS lookup and return a result.

FIG. 11 illustrates sample query results.

FIG. 12 illustrates an example system triage queue.

FIG. 13 illustrates an example triage alert detail.

FIG. 14 illustrates an example of additional steps that may be added.

FIG. 15 illustrates an example triage check list showing status of various steps.

FIG. 16 illustrates an event fact table after DNS lookup.

FIG. 17 illustrates an example triage process for an alert that has been completed.

FIG. 18 illustrates an example playbook following a phishing incident.

FIG. 19 illustrates example tasks for a playbook, in the context of a phishing attack.

FIG. 20 illustrates an example interface for task status reporting.

FIG. 21 illustrates an example interface showing adding a task.

FIG. 22 illustrates an example interface showing the incident complete.

DETAILED DESCRIPTION OF THE INVENTION

Functional Overview

FIG. 1 provides a high-level functional overview of the system. As shown in

FIG. 1, the system is designed to receive security alerts. These alerts are typically from security tools; in some instances, they may also be e-mails sent directly by a human or information typed into a programmed form by a human. Non-limiting examples of alert sources include Intrusion Detection or Intrusion Prevention Systems (IDS/IPS), malware detection systems, e-mail phishing detection systems, firewalls, or Security Information Event Management (SIEM) systems. These alerts are either transmitted to the system in a formatted e-mail, or directly via a pre-defined application program interface (API) formatted using JavaScript Object Notation (JSON). An alert may also be created directly in the system by a human user by filling out a system customizable form with basic alert information.

Although the incoming alert when received via e-mail needs to have some basic formatting for the system to parse it properly, specific alert formats are not proscribed and are fully customizable in the system. The system can process different types of alerts in different formats. There is no limit to the number of alerts that can be configured for processing by the system.

When the system receives alerts, either via e-mail, JSON API, or by a form completed in the user-interface, the system software examines the alert and automatically extracts (or parses) key fields and data elements.

These extracted data elements can include standard and/or customized alert fields. Some non-limiting examples of these fields include computer hostname, username, reporting person, uniform resource locators (URL's), source internet protocol address (Source IP), destination internet protocol address (Destination IP), alert type, alert severity, alert date and time, cryptographic hash value (typically Secure Hash Algorithm [SHA], MD5, or RSA), and description. There is no limit to the number of fields that may be extracted from an alert.

Figure 2:
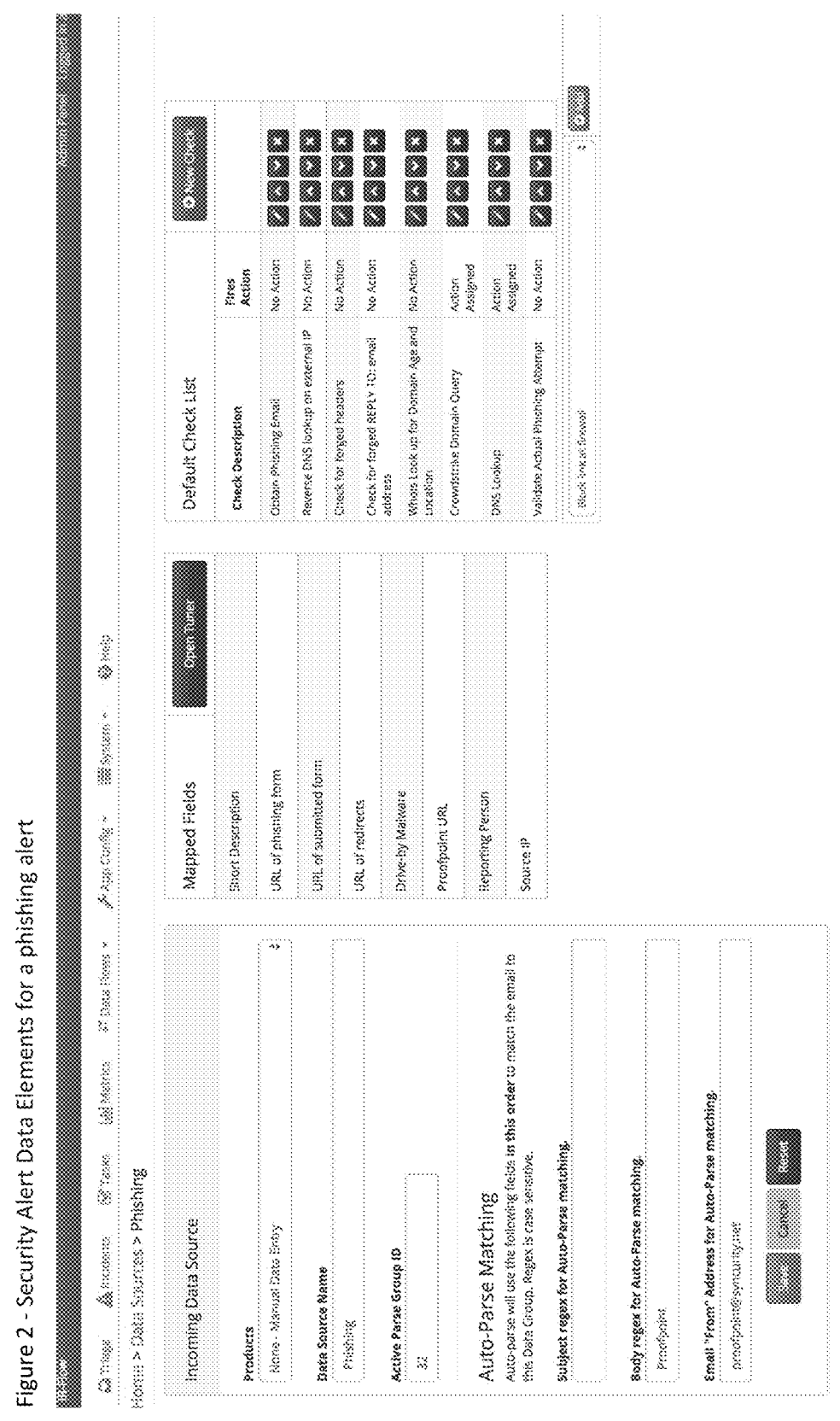

If the alert is transmitted via e-mail, the system uses the incoming e-mail address that sent the alert, combined with identifying information either in the subject or email body to match against the system database to identify a list of fields to extract for the given alert type (see FIG. 2 for an example). In the event the alert is sent via the JSON API the data elements to extract are embedded in the JSON structure. If the alert is manually entered via the user-interface the fields are specified in the alert creation form.

FIG. 3 documents the process flow for new alerts received by the system. The data elements that the system searches for and extracts from alerts may be fully customized by the user. Once these data elements are extracted the alert information and its associated elements are stored in the system's alert and incident database. This database contains all historical alerts, incidents, and associated data elements created or received by the system.

An incident is a logical grouping of one or more alerts that the system or user has determined requires additional action to analyze, contain, or remediate. Where the term "alert" is used in this document it may refer to either an alert that is part of an incident or an alert that has not yet been determined to be part of an incident.

Triage Ranking Engine

After the alert has been parsed and stored in the database, the Triage Ranking Engine is automatically run to assign the alert an initial importance score. The importance score is re-computed (re-ranked) any time facts or data about an alert change. The process flow for the Triage Ranking Engine is documented in FIG. 4. Additional disclosure of the computation and usage of these importance rankings is provided elsewhere in the specification.

After the Triage Ranking Engine is run, the Expert System automatically queries other security systems, tools, or information databases to enrich the alert and provide additional context. Queries may be to any tool, system or database within the customer's enterprise or to open-source tools, systems, or databases on the Internet. As shown in FIG. 1, non-limiting examples of systems that can be queried include Threat Intelligence Feeds, IT Asset Databases, and Endpoint agents. Queries can happen automatically for all incoming alerts after initial system configuration. There is no limit to the number of queries that can be configured for an alert.

The Expert System has the ability to transmit information from the system database to these other systems as part of these queries. Any data element or derived fact that is associated with an alert or incident and stored in the system database may be transmitted as a query parameter by the Expert System. This specifically includes a data file or an address or link to a location where a data file is stored by the system. FIG. 5 documents the basic process flow used by the Expert System.

FIG. 6 shows a default check list for a phishing alert that uses the expert system to automatically run a DNS lookup and a Crowdstrike domain query.

Automated queries are configured in the system once and then made available to the user in a library for re-use. Automated queries may also be initiated manually by the user. There is no limit to the number of unique queries that may be configured in the system. Queries function by calling a UNIX shell command, a script, or an external program that performs the query and returns back the results for parsing. FIG. 7 through FIG. 10 demonstrate the configuration of a query to perform a DNS lookup and return a result.

As illustrated in FIG. 7, the software accepts as input the description, the script to be run, and information on error handling and argument format. FIG. 7 also enables the user to associate object data classes with specific integration configurations. FIG. 8 and FIG. 9 show the configuration of the input parameters for the script, FIG. 10 shows the configuration for storing output from the query into data elements in the database.

When an automated query is run, the results returned are stored in the database as new data elements that are associated with the alert for future use by the system; they may also may be viewed by the user as shown in FIG. 11.

All alerts when received by the system are assigned a default priority based on the source of the alert, the type of the alert, or the content of a data element in the alert.

After the alert has been saved into the database, it is automatically scored by the Triage Ranking Engine for importance as described herein. Any time additional information (data elements) are added or modified for a given alert, that alert is re-scored by the Triage Ranking Engine. The Triage Ranking Engine computes the importance using a weighted multi-factor algorithm that will be described later. The importance ranking is not the same as the default assigned priority.

One of the key problems in cybersecurity is that the sheer volume of alerts received normally exceeds the ability of humans to process them, and many alerts need some level of human attention and inspection; as such when prioritizing and assigning resources it is critical that the most important alerts be examined and remediated first.

Also, the system generating a cybersecurity alert often has incomplete or very limited contextual information to assess priority or importance. For example, if an alerting system detects the presence of malware, it will typically base the priority or importance of the alert on unique attributes of the detected malware, such as its hash value. This approach leads to the same malware instance always receiving the same assigned priority. In fact, from the user's perspective, the priority and importance of the malware is greatly related to other external elements, such as the operational or business use of the system it has infected. A malware infection that is found on the CEO's laptop would typically be assigned the same priority as an identical malware infection found on a computer that is used to generate the cafeteria menu, however in most operational settings the priority of the latter infection would be much lower.

The system described herein solves this issue by dynamically scoring all alerts with the Triage Ranking Engine in a fashion customized to the specific operating environment. Each data element may be assigned a normalized importance score and the scores for all data elements associated with an alert are combined using a customizable formula to derive an importance ranking. The triage queue of alerts is then sorted in order of importance and the most important alerts are presented for human review first.

The alert queue is dynamically re-scored by the Triage Ranking Engine and re-sorted by importance whenever a new alert is received or whenever a data element on an alert is updated by the Expert System.

Historical importance scores are retained in the system database and accessible as part of the alert history. The system has the ability to show how the importance score for an alert has changed over time. Thus the system records the evolution of the importance of an alert based on the information available at each point in time, and tracks changes that occur as new information becomes available.

Table 1 demonstrates a default weighted scoring algorithm used to dynamically score alerts; the weights and elements of this scoring algorithm are fully customizable by the user. In this non-limiting example, the user has configured the Triage Ranking Engine, by selecting six data elements associated with alerts. Each of the six data elements has also been given a data value range which represents the ranking criteria for assigning the data element value, and a relative importance from 1 (most important) to 4 (least important). The relative importance ranking of 1 to 4 is not limiting and may be implemented with a different numeric scale.

TABLE 1

Non-limiting example of configuration of automatic ranking of importance of alerts.

| Data Element Name | Description | Data Value Range | Relative Importance |
|---|---|---|---|
| Origional Alert Priority | Alert Priority as received from originating system | Low[3]/Medium[2]/High[1] | 4 |
| Asset Risk Rating | Asset risk priority as retrieved from IT Dept Database | 1-10, 10 is lowest, 1 is highest risk | 3 |
| Department Risk | Risk Factor for Department that owns asset that generated alert | 1-5; 1 is highest weighted factor | 2 |
| Alert Type | Was this a malware alert | Boolean Yes/No | 2 |
| HASH | does HASH attached to event match HASH of interest | Boolean Yes/No | 1 |
| Prior alert detected | Prior alert from specific IP within last 6 months | Boolean Yes/No | 1 |

Table 2 provides a sample computation of an importance score by the Triage Ranking Engine for an alert based on the weights and elements selected in Table 1.

TABLE 2

Sample Computation of Importance Score for an Alert

| Example Value | Normalized Score | Weighted Score |
|---|---|---|
| Medium (2) | 0.66 | 0.165 |
| very high (2) | 0.9 | 0.3 |
| Corporate (2) | 0.8 | 0.4 |
| No (0) | 0 | 0 |
| Yes (1) | 1 | 1 |
| Yes (1) | 1 | 1 |
|  |  | 2.865 |

The system first assigns a numeric value to each data element based on the data value range specified in Table 1, then it computes a normalized score between 0 and 1 for each data element. Although the example provided herein uses linear normalization of the ranking criteria, with the lowest value possible being the linear increment above 1 (i.e. if the values are in the range 1-3, normalize across the line from 0-3, so 1=0.33, 2=0.66 and 3=1), this example is not intended to be limiting and the system may also be configured to performed a non-linear normalization of these scores.

The system then computes a weighted score for each element and sums these scores to produce the overall score (2.865 in the example) for the alert. In the example shown, the weighted score is calculated by simple fractional weighting and is computed by multiplying the normalized score by 1/n, where n is the relative importance for the data element. This computational approach for weighted score is non-limiting, the system may also be configured to use a different weighting approach, one example would be a logarithmic weighting [the weighted score=normalized score* 10^relative importance], another approach would be a function which returns the maximum normalized score for any one data element.

In addition, the system fully supports other customized importance scoring algorithms, including the addition of derived data elements based on the analysis of data in the database. Non-limiting examples of these customized importance scoring algorithms include:

The ability to automatically make a determination if an advanced persistent threat (APT) attack is active (ongoing) and automatically adjust the importance score of the alert as appropriate.

The ability to make an automatic determination that a new alert is related to a prior or current alert or incident in the system's historical event database and automatically adjust the importance score of the alert accordingly.

The ability to automatically identify that multiple alerts received within a designated time window for a specific asset as identified by IP address or hostname are in fact related and automatically adjust the importance score as appropriate on all of the received alerts.

The ability to automatically adjust the importance score of the alert as appropriate based on a specific keyword that is present in the incoming alert.

The ability to automatically adjust the importance score of the alert as appropriate based on the amount of time it has been since it was received by the system.

The ability to automatically adjust the importance score of the alert as appropriate based on the amount of time it has been in a particular state, non-limiting examples being the amount of time since the alert was assigned to an analyst or team by the system, the amount of time since the alert was viewed or updated by a system user or by the system.

The Triage Ranking Engine may be configured so that different weighted scoring algorithms like the one shown in Table 1 above are used for different alert types. As such the system is not limited to just one algorithm for computing importance scores.

Expert Assessment and Remediation System

The Expert Assessment and Remediation System, also referred to as the Expert System, also has the ability to automatically initiate containment, remediation, or other scripted or programmed actions for any alerts, as well as derive new data elements (known as facts in industry standard language about expert systems) based on expert system reasoning. The Expert System is constructed on "if this then that" (IFTTT) logic framework that operates on a set of user defined rules, and a fact base. In this system, the fact base is composed on every data element associated with an alert or incident in the database. The rule base is a set of rules that embodies artificial intelligence embedded in the system. The rules can be fully customized by the end user to meet their operational needs. This allows the entire system to make decisions about specific actions to take based on data elements in an alert, regardless of whether these data elements are parsed from an alert, added as part of the automatic enrichment process, added based on a human interaction with the system, or associated with a different (related) alert.

The Expert System also has the ability to identify and suggest alerts that may be automatically contained or remediated, these suggestions are based on an analysis of historical alerts received by the system or based on external system information such as a threat intelligence database or feed. One such database/feed is comprised of aggregated and anonymized alert data across all system installations. The Expert System uses this data to identify patterns of use over time and to learn and suggest self-optimizations related to alert containment and remediation.

Some non-limiting examples of a scripted or programmed actions that can be initiated by the Expert System include:

A rule to send an e-mail for any alerts that exceed a given importance score. Such a rule ensures immediate notification and review of alerts that have high importance or have their importance escalated based on new evidence about the alert, as defined by the Triage Ranking Engine, such as if the Expert System automatically identifies that the alert is related to a prior incident, adjusts the importance score and then sends a notification e-mail.

The Expert System uses data in the fact base to identify an event as a true positive indicator of an attack, and automatically executes a script or program to isolate the infected system on the network so that the attack cannot spread further or continue.

The Expert System uses data in the fact base to identify an event as an indicator of a known attack type or class and automatically executes a script or program to remediate (clean) the infected system or systems.

The intelligence embedded in the Expert System can be expanded by the system itself. This is enabled by the application of machine learning techniques to the historical information contained in the database about fully enriched and resolved alerts. The machine learning algorithms may learn new rules to be added to the rules base which allow the system to perform tasks that human operators have performed in the past. There are many examples of machine learning algorithms that can be applied to this data, but one non-limiting example would be the use of the ID4 algorithm (an algorithm for the induction of decision trees from exemplar data) to determine the data elements and values that would correctly classify alerts that have been closed by humans as false positives vs. those that are not false positives. The ID4 algorithm would suggest rules that identified alerts as strong candidates for automatic closure by the system as false positives. In this manner the system learns to suggest certain alerts for automatic closure and greatly improves the human's ability to process the vast number of alerts, or allow the Triage Ranking Engine to use the Expert System's recommendation that an alert be automatically closed to lower the importance of that alert. Thus, the Expert System recommendation, based on an analysis of historical alerts received by the system and resolved by human intelligence can become another data element to feed the Triage Ranking Engine.

Triage, Enrichment, and Response Embodiment

Figure 12:
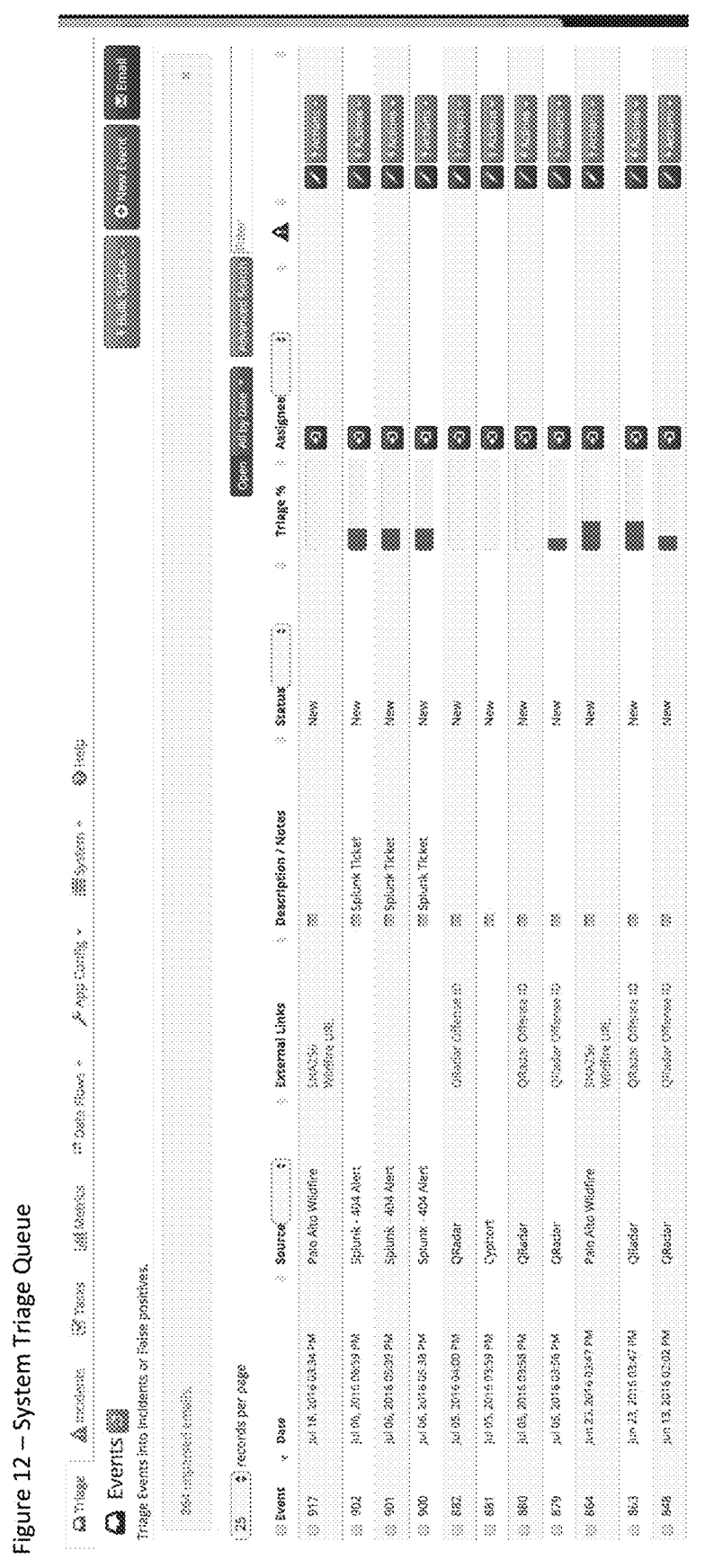

In this typical cybersecurity use case, the system receives one (or more alerts) via e-mail, API, or manual entry as described above. For instance, the system may receive one or more alerts which indicate the possible presence of malware on a host system. These alerts are automatically parsed by the system and stored in the database with a default priority as described above. These alerts are also scored for importance by the Triage Ranking Engine using the process documented in FIG. 4 above. All such alerts are displayed to the user in the system triage queue as shown in FIG. 12.

In this embodiment the system user examines a malware alert from the Wildfire system by selecting it from the queue which causes the system to display additional detail about the alert in the form of data elements parsed from the alert and a list of steps required to complete the triage process on the alert as shown in FIG. 13. On the left-hand side of FIG. 13, the system displays the data elements that have been automatically parsed from the alert, in this case the destination IP, hash (SHA256), Source IP, and username, as well as a URL to click through to the Wildfire system and the Wildfire verdict (analysis) about this alert. This sample alert indicates the presence of malware on a system.

The steps shown on the right provide a checklist of six items to be completed in order to complete the triage of this alert. The user completes these steps, checking them off as the user progresses, to triage the alert. The steps shown in this example are executed manually by the user, but any of these steps may be configured to be run automatically at the user's discretion. The user may also add additional steps into the process by selecting an action to fire (execute) as shown in FIG. 14. In this case, the user has chosen to execute a DNS lookup on an IP address of interest, 8.8.8.8. The results of the DNS lookup are returned to the user as shown in FIG. 15, which also indicates the user has now completed two of the six pre-configured steps and the DNS lookup, and is now 43% (3/7) complete with Triaging this event. FIG. 15 illustrates an example triage check list showing status of various steps. The system has also been configured to attach this DNS Lookup as a part of the event facts, as shown in FIG. 16. As additional steps are completed the results are documented either automatically in the database or manually as shown in FIG. 17, which also shows that the triage process for this alert has now been completed as the remaining four steps have been checked off and documented. At this point in time, the analyst makes a decision to either close the event (no further action required) or to escalate it to a formal incident by selecting the appropriate menu item on the screen.

In this case, through the triage process, the user determined that this event should be escalated to a formal incident for additional processing and that the malware was the result of a successful phishing attack. After making the appropriate menu selection to escalate the event to a phishing incident, the user is presented with a playbook shown in FIG. 18. In this figure, the Incident Summary is displayed on the left hand side of the screen and a list of tasks is displayed on the right hand side of the screen. Similar to the triage phase, each task consists of one or more steps as shown in FIG. 19, which shows the step for the first task in the playbook. As with the triage process steps may be either automatically or manually executed.

There is no limit to the number of steps in a task, there is no limit to the number of tasks in a playbook, and there is no limit to the number of playbooks in the system. Playbooks can be uniquely associated with and incident type and subtype.

Tasks may have dependencies. As illustrated in FIG. 18, four of the tasks have a status of "Waiting" because they may not be started until other tasks are completed.

The analyst continues to work through the process of executing the playbook to contain and remediate the incident by completing the individual steps associated with each task.

Figure 20:
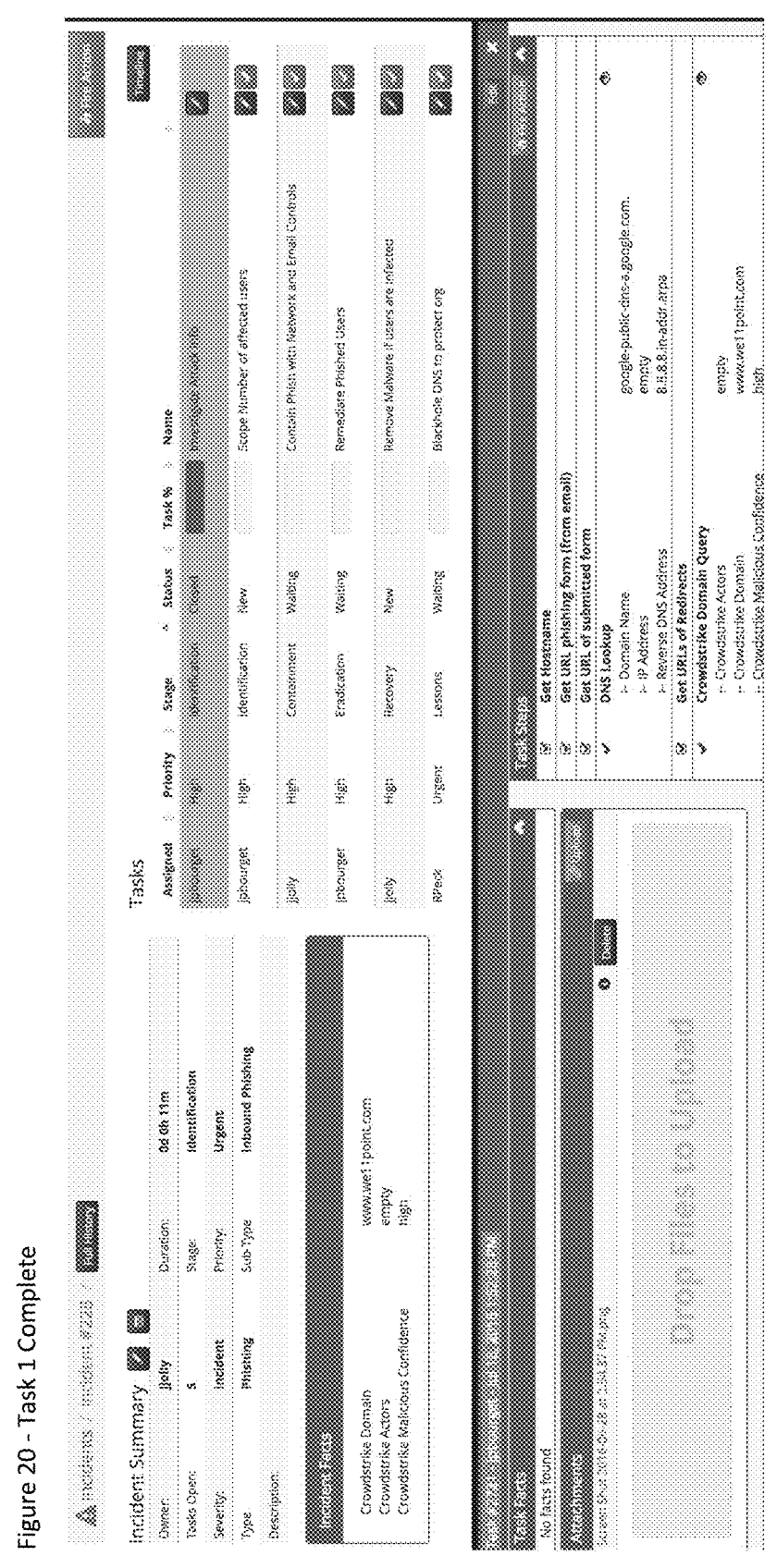

FIG. 20 illustrates the completion of Task 1, "Investigate Attack Info". Note that all Task Steps have been completed, that the analyst ran an additional automatic query to Crowdstrike that is reflected as a task step and shown on the left as a fact associated with the incident, and that the completion of Task 1 has caused the status of Task 2, "Scope Number of Affected Users" to change from "Waiting" to "New" indicating it is now available for completion. The user has also uploaded a file on the bottom left of the screen into the system database, this file contains a screenshot of the original phishing email.

The analyst proceeds through the remainder of the tasks in the playbook in a similar manner, completing individual tasks steps (where manual, any step may be automated if the system is so configured) until the playbook is complete.

If the analyst decides that additional tasks are required to complete the incident, the analyst may use the "Add Task" feature to insert them in real time. FIG. 21 shows that the analyst has inserted a "Clean System" task into the Playbook while in the process of completing the incident. There is no limit to the number of tasks that may be inserted in this manner in real-time; they may be inserted from the library of pre-built tasks stored in the database or manually created at the time they are inserted.

FIG. 22 shows that all playbook steps have been completed and the incident Stage (top-left) is now closed.

Alert Importance Re-ranking Embodiment

In this embodiment, the system receives a security alert via e-mail, API, or manual entry indicating the potential presence of an APT (Advanced Persistent Threat). The particular APT indicated by the alert is of the type that is known for implanting a hidden process on the attacked system that enables the attackers to search for, encrypt and steal data of interest from the attacked system via a surreptitious data transfer back to a controlling computer that launched the attack.

As described in the functional overview above, the alert is parsed by the system and key data elements are extracted and stored in the system database. The alert is assigned a default priority of high and is also assigned an initial importance score by the Triage Ranking Engine using the algorithm in Table 1 above with the computation as shown in Table 3.

TABLE 3

Initial Importance Scoring for APT Alert

| Example Value | Normalized Score | Weighted Score |
|---|---|---|
| High (1) | 1.00 | 0.25 |
| low (7) | 0.30 | 0.10 |
| Unknown (4) | 0.40 | 0.20 |
| Yes (1) | 1.00 | 0.50 |
| No (0) | 0.00 | 0.00 |
| No (0) | 0.00 | 0.00 |
| | | 1.05 |

Note that at this point in time, an analyst has not yet examined the alert, which remains in the triage queue with other incoming alerts for the system.

The Expert System can automatically run specific scripts for this type of alert, such as:

An automated script to query the IT configuration management database and return additional context about the asset that is under attack, including the individual who owns the asset and the last person to log into the asset.

An automated script to look for evidence that there is a live breach in progress by scanning for the presence of a hidden process on the attacked host via a query to the endpoint agent installed on the host.

The first script is run and it determines that the asset in question resides in the CEO's office and was last logged into by the CFO ten minutes ago. This script results in the Asset Risk Rating for the alert being raised from low (7) to very high (1); it also changes the Department Risk score from Unknown (4) to Corporate (2). At this point in time the Triage Ranking Engine automatically rescores the alert, raising the score from the original 1.05 to a new score of 2.48 based on the computation as shown in Table 4.

TABLE 4

Alert Re-Scored for Importance

| Example Value | Normalized Score | Weighted Score |
| --- | --- | --- |
| Hight (1) | 1.00 | 0.25 |
| very high (1) | 1.00 | 0.33 |
| Corporate (2) | 0.80 | 0.40 |
| Yes (1) | 1.00 | 0.50 |
| No (0) | 0.00 | 0.00 |
| Yes (1) | 1.00 | 1.00 |
|  |  | 2.48 |

The second script is now automatically run; this script identifies several potentially malicious hidden processes in memory and running on the attacked host, and that a network transfer session is ongoing. The script extracts the hash from the running file and passes it back to the system. The Expert System has been configured with IFTTT logic so that when the script returns a hash of an executing potentially malicious processes the system runs queries to Crowdstrike and VirusTotal to see if the hash correlates with a known malicious process. The query to Crowdstrike identifies the hash as malicious, the query to VirusTotal does not identify the hash as malicious. The system has been configured so that anytime a query returns a hash as malicious it automatically adjusts the Boolean score for the Hash to Yes (1). Because the scoring has changed the Triage Ranking Engine is re-run and now computes the importance score as shown in Table 5.

TABLE 5

Alert Re-Scored Again for Importance

| Example Value | Normalized Score | Weighted Score |
| --- | --- | --- |
| High (1) | 1.00 | 0.25 |
| very high (1) | 1.00 | 0.33 |
| Corporate (2) | 0.80 | 0.40 |
| Yes (1) | 1.00 | 0.50 |
| Yes (1) | 1.00 | 1.00 |
| Yes (1) | 1.00 | 1.00 |
|  |  | 3.48 |

Note that at this point in time the alert has still not been examined by a human analyst. The SOC in question has a policy that anytime the importance score on an alert is above 3 it must be looked at by an analyst within 5 minutes. The Expert System is aware of this policy and automatically sends an e-mail to SOC manager on duty notifying of the alert. The SOC manager immediately assigns an analyst to examine the alert. The analyst examines the original alert as well as the contextual data that was automatically provided by the automated queries and realizes that the malicious process is still executing on the attacked host. The analyst executes a script that has been pre-configured in the system's integration menu to take the attack system offline so that no more data can be stolen. Now that the immediate threat has been countered the analyst uses another pre-built integration to open a Remedy ticket for the IT team to re-image the attacked system. The status of this Remedy ticket is automatically checked by the system and one the re-image is reported as completed in Remedy the incident in the system is marked as closed.

Automated Remediation Embodiment

This embodiment will describe using the Expert System to implement a fully automatic process to remediate a system that has been infected with malware by an attacker. In this embodiment, the system receives a security alert via e-mail or API from a Wildfire system indicating the presence of a known malware variant on a computer system. As described in the functional overview above, the alert is parsed by the system and key data elements are extracted and stored in the system database.

Because the malware variant indicated by this alert is well-known and understood, it is possible to automate the process of removing the malware from the infected computer system and restoring the infected system to a safe status for operational use.

Once the alert has been received and parsed into data elements, the Expert System automatically runs a query to VirusTotal to examine the hash parsed from the alert to see if it matches a known malware variant. This query is pre-built using the system dialogues as discussed and described in FIG. 7-FIG. 11 above.

VirusTotal matches the hash passed from the system to a known malware variant known as "Rdn/Generic Qhost", and this is returned from VirusTotal to the system and parsed into a data field in the event fact table. The Expert System inspects this data field after VirusTotal and using it's IFTTT logic identifies Rdn/Generic Qhost" as a known malware variant for which an automated remediation script exists in the system.

The Expert System logic used to uniquely identify this malware variant was developed by the system over time based on analysis in patterns of past alerts stored in the system database.

The Expert System now executes the appropriate script to remove the malware from the infected system. Once the script is completed it returns an indicator which indicates success or failure. If the script succeeds the system closes the event with the status "Closed—Automatically Remediated"; if the script does not succeed, then the event remains open and is manually remediated by an analyst. In this manner the Expert System enables full and automatic identification and remediation of known or learned cybersecurity infections.

System Architecture

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions. A processor or computer system can be configured to particularly perform some or all of the method described herein. In some embodiments, the method can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described herein), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C #, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™ etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the registers of a computing system and/or memories into other data similarly represented as physical quantities within the memories of a computing system, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system"

and "method" are used herein interchangeably insofar as the system may embody one or more methods and the methods may be considered as a system.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What is claimed is:

1. A non-transitory computer readable storage medium storing one or more programs that are executed by one or more processors of a cybersecurity system to perform operations, comprising:
   receiving a security alert that indicates a threat to the cybersecurity system;
   extracting data elements from the security alert, the data elements including at least one of an internet protocol (IP) address, a hash, an alert priority, an alert type, a description of the threat, or a hostname;
   using the data elements to obtain additional information regarding the security alert, the additional information including at least one of a domain name, a domain name system (DNS) address, the description of the threat, a confidence level of the threat or a result of a DNS lookup query or a domain query;
   adding the additional information regarding the security alert as new data elements of the security alert;
   ranking the security alert in importance based on the data elements and new data elements of the security alert;
   re-ranking the security alert when any of the data elements of the security alert change, when a new security alert is received or based on an amount of time since the security alert was assigned for resolution or an amount of time since the security alert was received or updated; and
   issuing a command to take a programmed action for the security alert based on the data elements and the security alert ranking using an if this then that (IFTTT) expert system.

2. The computer readable storage medium of claim 1, wherein the operations further comprise:
   applying machine learning to user resolution of alerts that were received by the cybersecurity system to determine that the security alert is a false positive or a true positive, whereby the programmed action for the security alert is automatic closure of the security alert by the cybersecurity system if the security alert is a false positive, and automatic escalation of the security alert by the cybersecurity system if the security alert is a true positive.

3. The computer readable storage medium of claim 1, wherein the operations further comprise:
   using a messaging system to automatically inform a user about a status, a disposition, a creation, or the receipt of the security alert.

4. The computer readable storage medium of claim 1, wherein the operations further comprise receiving the security alert by a pre-defined application program interface (API).

5. The computer readable storage medium of claim 1, wherein the operations further comprise receiving the security alert from an email containing ASCII text.

6. The computer readable storage medium of claim 1, wherein the additional information regarding the security alert is obtained from at least one of a threat-intelligence database, a threat intelligence feed, an information technology asset inventory system, a security information event management system, and an end-point system.

7. The computer readable storage medium of claim 1, wherein the programmed action includes a remedial or containment action.

8. The computer readable storage medium of claim 1, wherein the programmed action further comprises:
   identifying a known malware variant based on malware information stored in a data field in an event fact table; and
   executing a script to remove malware, wherein the script is selected based on the known malware variant.

9. The computer readable storage medium of claim 1, wherein the operations further comprise:
   assigning a normalized importance score to each data element for the security alert; and
   combining the scores for the security alert using a formula to derive the ranking.

10. The computer readable storage medium of claim 9, wherein the operations further comprise:
    sorting a queue of alerts in order of importance; and
    presenting the queue of alerts for review in order of their importance.

11. The computer readable storage medium of claim 10, wherein the operations further comprise:
    dynamically re-scoring and re-sorting the alert queue by importance when the new security alert is received or when a data element of the security alert is updated.

12. The computer readable storage medium of claim 1, wherein the operations further comprise:
    retaining historical importance scores for the security alert in a system database as part of an alert history; and
    displaying a representation of the historical importance scores for the security alert over time.

13. The computer readable storage medium of claim 1, wherein the operations further comprise determining that an advanced persistent threat attack is ongoing and adjusting the importance of the security alert accordingly.

14. The computer readable storage medium of claim 1, wherein the operations further comprise determining that the new security alert is related to a prior alert in a historical alert database and adjusting the determining an importance of the new security alert accordingly.

15. The computer readable storage medium of claim 1, wherein the operations further comprise:
    determining that multiple alerts received within a designated time window for a specific asset as identified by an IP address or a hostname are related, and determining an importance score of the received multiple alerts accordingly.

16. The computer readable storage medium of claim 1, wherein the operations further comprise adjusting the importance of the security alert based on a specific keyword present in the security alert.

17. The computer readable storage medium of claim 1, wherein re-ranking the security alert includes re-ranking the security alert based on the amount of time since the security alert was received.

18. The computer readable storage medium of claim 1, wherein re-ranking the security alert is based on one or more of: the amount of time since the security alert was assigned and the amount of time since the security alert was received or updated.

19. The computer readable storage medium of claim 1, wherein the additional information regarding the security alert includes information about an asset that is under attack, wherein the information about the asset includes a person who owns the asset and a last person to log into the asset.

20. A cybersecurity system having a non-transitory computer readable storage medium storing one or more programs for execution by one or more processors, the one or more processors configured to:
receive a security alert that indicates a threat;
extract data elements from the security alert, the data elements including at least one of an internet protocol (IP) address, a hash, an alert priority, an alert type, a description, or a hostname;
determine a score for each data element of the security alert;
determine an importance score for the security alert based on the score for each data element:
rank the security alert in importance based on the importance score;
re-rank the security alert after any of the data elements for the security alert change; and
issue a command to take a programmed action for the security alert based on the data elements and the security alert ranking, using an if this then that (IFTTT) expert system.

* * * * *